US008114261B2

(12) United States Patent
Lee et al.

(10) Patent No.: US 8,114,261 B2
(45) Date of Patent: Feb. 14, 2012

(54) MICROFLUIDIC DEVICE FOR ELECTROCHEMICALLY REGULATING PH OF FLUID

(75) Inventors: Hun-joo Lee, Seoul (KR); Joon-ho Kim, Seongnam-si (KR); Chin-sung Park, Yongin-si (KR); Jung-im Han, Seoul (KR); Seung-yeon Yang, Seongnam-si (KR); Shin-i Yoo, Gunpo-si (KR)

(73) Assignee: Samsung Electronics Co., Ltd. (KR)

( * ) Notice: Subject to any disclaimer, the term of this patent is extended or adjusted under 35 U.S.C. 154(b) by 1582 days.

(21) Appl. No.: 11/453,538

(22) Filed: Jun. 15, 2006

(65) Prior Publication Data

US 2007/0034504 A1 Feb. 15, 2007

(30) Foreign Application Priority Data

Aug. 10, 2005 (KR) ........................ 10-2005-0073273

(51) Int. Cl.
*B01D 61/44* (2006.01)

(52) U.S. Cl. ........................................ 204/600; 204/630

(58) Field of Classification Search .................. 204/600, 204/630

See application file for complete search history.

(56) References Cited

U.S. PATENT DOCUMENTS

| | | | | |
|---|---|---|---|---|
| 4,105,516 | A * | 8/1978 | Martinsons et al. | 205/351 |
| 6,942,018 | B2 * | 9/2005 | Goodson et al. | 165/80.4 |
| 7,771,573 | B2 * | 8/2010 | Lee et al. | 204/252 |
| 2006/0169598 | A1 * | 8/2006 | Lee et al. | 205/755 |

FOREIGN PATENT DOCUMENTS

| | | | |
|---|---|---|---|
| KR | 1020050052723 | | 6/2005 |
| WO | WO 98/22813 | * | 5/1998 |

OTHER PUBLICATIONS

"On-chip cell lysis by local hydroxide generation", Authors: Dino Di Carlo, et al.; Lab Chip, 2005, 5, pp. 171-178.

* cited by examiner

*Primary Examiner* — Arun S Phasge
(74) *Attorney, Agent, or Firm* — Cantor Colburn LLP

(57) ABSTRACT

A microfluidic device for electrochemically regulating the pH of a fluid includes: an ion-exchange material; an anode chamber having a surface defined by a surface of the ion-exchange material and an anode electrode disposed along an edge of the surface of the anode chamber; and a cathode chamber having a surface defined by an opposite surface of the ion-exchange material and a cathode electrode disposed along an edge of the surface of the cathode chamber.

8 Claims, 6 Drawing Sheets

MICROFLUIDIC DEVICE FOR ELECTROCHEMICALLY REGULATING PH OF FLUID

This application claims the benefit of Korean Patent Application No. 10-2005-0073273, filed on Aug. 10, 2005, in the Korean Intellectual Property Office, the disclosure of which is incorporated herein in its entirety by reference.

BACKGROUND OF THE INVENTION

1. Field of the Invention

The present invention relates to a microfluidic device for electrochemically regulating the pH of a fluid therein and a method of electrochemically regulating the pH of a fluid using the microfluidic device.

2. Description of the Related Art

A microfluidic device refers to a device in which an inlet, an outlet, a reaction vessel, etc., are connected through microchannels. The microfluidic device also includes a micropump for transporting fluids, a micromixer for mixing fluids, and a microfilter for filtering fluids.

Such a microfluidic device is well known in the art and is used in a microanalysis device such as a lab-on-a-chip (LOCs), which performs a series of biological analysis processes including cell enrichment, cell lysis, biomolecular purification, nucleic acid amplification like polymerase chain reaction (PCR), nucleic acid isolation, protein purification, hybridization, and detection.

To perform the various biological analysis processes, the microfluidic device requires different pH in each step. In the biological analysis processes, a conventional method of regulating pH is performed by adding or eliminating an acid solution, an alkaline solution, a neutralization solution, or a buffer solution. However, in this case, the microfluidic device requires a separate device and process to add or eliminate such a pH regulating solution and a sample solution is diluted. The solution injection step and the device can cause serious problems in handling materials in microvolumes and the dilution can case problems in obtaining and amplifying a desired sample. Furthermore, since the pH regulating solution may act as an inhibitor in the subsequent biological analysis process, the pH regulating solution must be removed after being used.

In an effort to solve the problem in the conventional method, there is suggested a method of regulating pH using electrolysis. For example, a method of lysing cells using a device including a cathode, an anode, and a filter is disclosed by Luke P. Lee et al., Lap on a Chip, 5(2):171-178, "On-chip cell lysis by local hydroxide generation", 2005. FIG. 1 is a schematic view for explaining a conventional method of lysing cells using an electrolysis device including a filter. Referring to FIG. 1, the conventional electrolysis device includes a cathode chamber 11, an anode chamber 12, and a filter 13 interposed between the cathode chamber 11 and the anode chamber 12. A hydroxyl ion $OH^-$ is generated in the cathode 11 to increase pH, and a hydrogen ion $H^+$ is generated in the anode 12 to decrease pH. Cells 16 are continuously introduced through an inlet 14 into the cathode chamber 11 to be caught by the filter 13. At this time, if an electric power is applied to the filter 13, the cells are lysed due to the increased pH, and DNA passes through the filter 13 and then the anode 12 to be discharged through an outlet 15 to a next chamber. However, since the hydroxyl ion $OH^-$ generated in the cathode chamber 11 continuously flows through the filter 13, pH high enough to achieve cell lysis cannot be maintained. Even though cell lysis occurs, separated DNA may be adhered to the anode chamber 12 and thus may not advance to the next chamber.

There is another method of regulating pH using an electrolysis device including an anode chamber, a cathode chamber, and a separating membrane installed between the anode chamber and the cathode chamber. However, since the separating membrane is too thin, it is technically difficult to manufacture a microfluidic device suitable for LOCs.

BRIEF SUMMARY OF THE INVENTION

The present invention provides a microfluidic device for electrochemically regulating the pH of a fluid.

The present invention also provides a method of regulating the pH of a fluid in a microfluidic device through electrolysis.

According to an aspect of the present invention, there is provided a microfluidic device for electrochemically regulating the pH of a fluid, the microfluidic device comprising: an ion-exchange material; an anode chamber having a surface defined by a surface of the ion-exchange material and an anode electrode disposed along an edge of the surface of the anode chamber; and a cathode chamber having a surface defined by an opposite surface of the ion-exchange material and a cathode electrode disposed along an edge of the surface of the cathode chamber.

According to another aspect of the present invention, there is provided a method of electrochemically regulating the pH of a fluid in the above-described microfluidic device, the method comprising: introducing a solution containing ions with a lower or higher standard oxidation potential than water in an anode chamber; introducing a solution containing ions with a lower standard reduction potential than water in a cathode chamber; and applying current to electrodes included in the anode chamber and the cathode chamber to cause electrolysis in the anode chamber and the cathode chamber and accordingly regulate the pH of the solution introduced to the anode chamber and the cathode chamber.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which preferred embodiments of the invention are shown.

According to an aspect of the present invention, there is provided a microfluidic device for electrochemically regulating the pH of a fluid.

Figure 1:
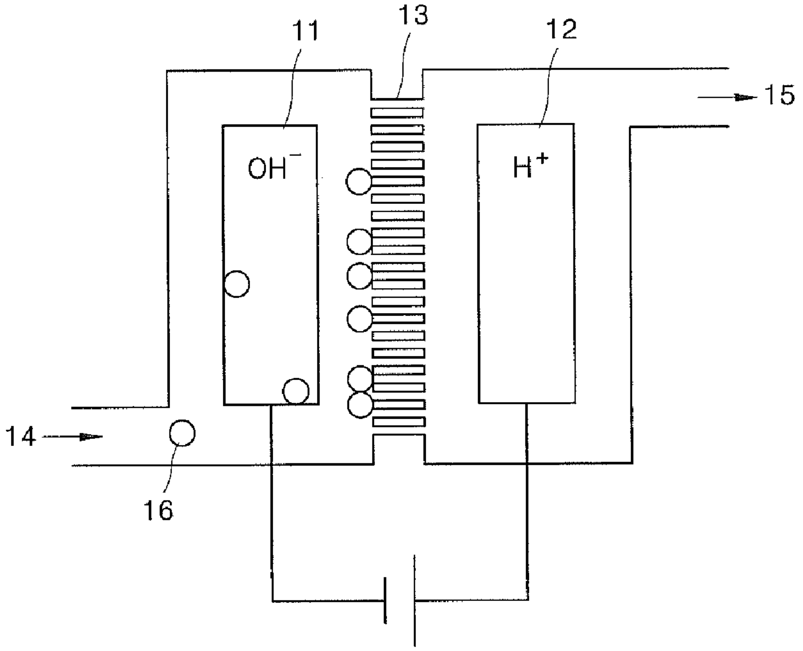
FIG. 1 Prior Art
FIG. 1 is a schematic view for explaining a conventional method of lysing cells using an electrolysis device including a filter.
Figure 2A:
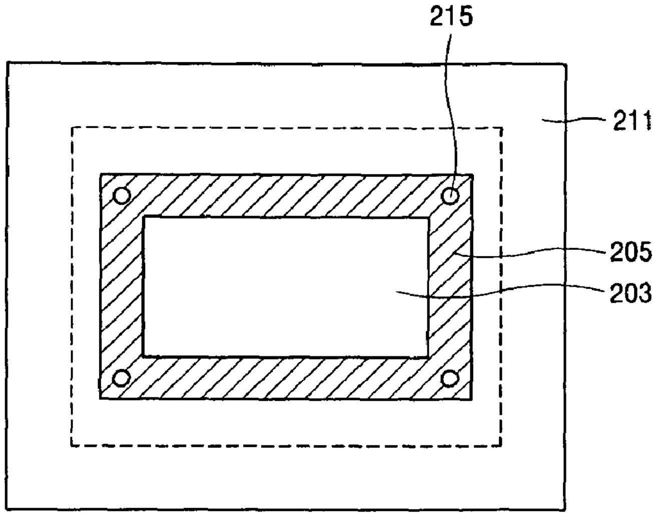
FIG. 2A is a plan view of a microfluidic device according to an embodiment of the present invention.
Figure 2B:
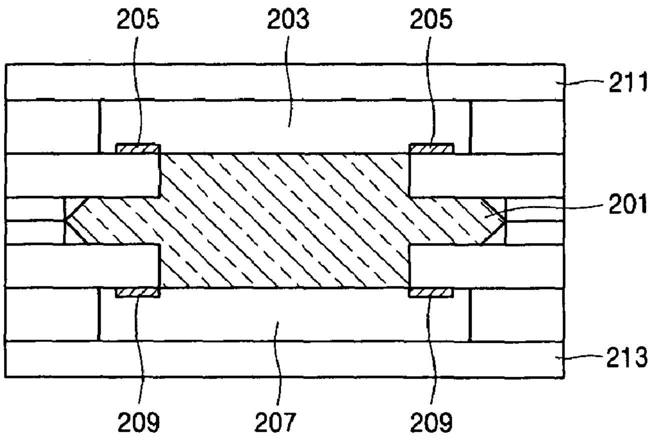
FIG. 2B is a side view of the microfluidic device of FIG. 2A.

FIG. 2A is a plan view of a microfluidic device according to an embodiment of the present invention. FIG. 2B is a side view of the microfluidic device of FIG. 2A.

Referring to FIGS. 2A and 2B, the microfluidic device for electrochemically regulating the pH of a fluid includes an ion-exchange material 204, an anode chamber 203 having a surface defined by a surface of the ion-exchange material 201 and an anode electrode 205 disposed along an edge of the surface of the anode chamber 203, and a cathode chamber 207 having a surface defined by an opposite surface of the ion-exchange material 201 and a cathode electrode 209 disposed along an edge of the surface of the cathode chamber 207.

Each of the anode chamber 203 and the cathode chamber 207 is a space in which fluids can be contained, and it may be preferably, but not limited to, a microchamber in which materials in microvolumes can be contained. The chamber may be any one selected from the group consisting of a cell lysis chamber, a nucleic acid isolation/purification chamber, a nucleic acid amplification chamber, a hybridization chamber, and a signal detection chamber. The chamber may be connected to various other chambers via microchannels. Accordingly, the microfluidic device according to the present invention may be configured in the form of a lap-on-a-chip (LOC) for electrochemically regulating the pH of a fluid.

The ion-exchange material 201 allows current to pass through, but does not allow ions and/or gas generated from electrolysis in each chamber to pass through. Preferably, the ion-exchange material 201 transmits current but blocks hydrogen ions and hydroxide ions and/or gas.

The ion-exchange material 201 may be a cation-exchange membrane or an anion-exchange membrane.

A cation-exchange membrane allows cations to flow therethrough, but not anions. On the contrary, the anion-exchange membrane allows anions to flow therethrough, but not cations. For example, the cation-exchange membrane may be a strong acid exchange membrane including —$SO_3$— (Nafion) or a weak acid exchange membrane including —COO—. The anion-exchange membrane may be a strong base exchange membrane containing $N^+(CH_3)$ or a weak base exchange membrane containing $N(CH_3)_2$. The cation-exchange membrane and the anion-exchange membrane are well known in the art and could be easily bought by one of ordinary skill in the art. Examples of the ion-exchange membrane include Nafion™ (Dupont), Dowex™ (Aldrich), and Diaion™ (Aldrich).

The ion-exchange material 201 may form a membrane simultaneously with a cross-linking reaction. In this case, the microfluidic device can be more easily manufactured.

Preferably, a material disclosed in Korean Patent Application No. 2005-52723, entitled "an ion-exchange mixture and a method of manufacturing the same", filed prior to the present invention by the applicant of the present invention, may be used as the ion-exchange material 201. The disclosure of the referred invention is incorporated herein in its entirety by reference.

That is, the ion-exchange material 201 may be a high molecular compound composed of an anion- or cation-exchange resin, an acryamide mixture containing at least one of bis-acrylamide and acrylamide, and a copolymer obtained by interaction of the acrylamide mixture and the high molecular compound.

The anion or cation-exchange resin may be a styrene resin, a phenol resin, an amine resin, or a methacryl resin. The anion-exchange resin may be a styrene resin substituted by trimethylamine, and the cation-exchange resin may be a styrene resin substituted by sulfonic group.

The bis-acrylamide may be N,N'-methylene-bis-acrylamide.

Also, the high molecular compound, the acrylamide mixture, and the copolymer may interpenetrate one another.

When the ion-exchange material 201 forms a membrane simultaneously with a cross-linking reaction, the ion-exchange material 201 is fixed to a frame.

To improve a coupling force between the ion-exchange material 201 and the frame, the frame may have a V-shape.

Each of the anode electrode 205 and the cathode electrode 209 may be selected from the group consisting of platinum, gold, copper, palladium, and titanium. When a Pt electrode is used in the anode chamber 203, adsorption of proteins and DNA can be prevented. When a Cu electrode is used in the anode chamber 203, it reacts with chloride, such as NaCl, in the anode chamber 203 to form $CuCl_2$, thereby reducing generation of toxic chlorine gas. Also, when a Pd electrode is used in the anode chamber 203, it absorbs hydrogen gas generated in the cathode chamber 207, and thus a gas removal process is not required.

In the present embodiment of the present invention, a solution containing ions with a higher or lower standard oxidation potential than water, that is, an electrolyte, may be introduced into the anode chamber 203. The ions with the lower standard oxidation potential than water may be one or more anions selected from the group consisting of $NO_3^-$, $F^-$, $SO_4^{2-}$, $PO_4^{3-}$, and $CO_3^{2-}$, and the ions with the higher standard oxidation potential than water may be an electrolyte containing $Cl^-$ ions, but are not limited thereto. When the anode chamber solution contains the ions with the lower standard oxidation potential than water, water in the anode chamber 203 is electrolyzed to produce oxygen gas and $H^+$ ions. In this case, the pH of the solution in the anode chamber 203 is reduced due to the $H^+$ ions. The $Cl^-$ ions with the higher standard oxidation potential than water can be specially used for cell lysis only.

Alternatively, a solution containing ions with a lower standard reduction potential than water may be introduced into the cathode chamber 207. The ions may be cations such as $Na^+$, $K^+$, $Ca^{2+}$, $Mg^{2+}$, and $Al^{3+}$, but are not limited thereto. Accordingly, when water in the cathode chamber 207 is electrolyzed, hydrogen gas and $OH^-$ ions are generated. In this case, the pH of the solution in the cathode chamber 207 is increased due to the $OH^-$ ions.

In a conventional device including a separator, an anode chamber having a first surface which is defined by a first surface of the separator and a second surface which faces the first surface and on which an anode electrode is disposed, and a cathode chamber having a first surface which is defined by a second surface of the separator and a second surface which faces the first surface and on which a cathode electrode is disposed, gas vent holes cannot be installed on the first surfaces facing the anode electrode and the cathode electrode. Accordingly, a great amount of gas is contained in fluids flowing through the chambers, thereby disturbing smooth current flow.

Meanwhile, referring to FIGS. 2A and 2B, the microfluidic device according to the present invention may further include vent holes 215 in a surface of the anode chamber 203 facing the anode electrode 205 and in a surface of the cathode chamber 204 facing the cathode electrode 209. Oxygen gas or hydrogen gas can be efficiently discharged through the gas vent holes 215.

Each of the anode chamber 203 and the cathode chamber 207 may include an inlet through which a solution is introduced and an outlet through which a solution is discharged. The inlet and the outlet may not be separated but one port may function as a combined inlet and outlet. Also, the gas vent holes may be used as the inlet and/or outlet.

Each of the anode chamber 203 and the cathode chamber 207 may include a pump for introducing and discharging a solution.

The microfluidic device may further include a frame which can fix the ion-exchange material 201. A portion of the frame contacting the ion-exchange material 201 may have a V-shape. In this case, when the ion-exchange material 201 forms a membrane, the ion-exchange material 201 can be further firmly attached to the frame, thereby improving the durability of the device.

The microfluidic device may be manufactured using a general method. Preferably, the respective elements of the microfluidic device may be manufactured first and then assembled.

Figure 3:
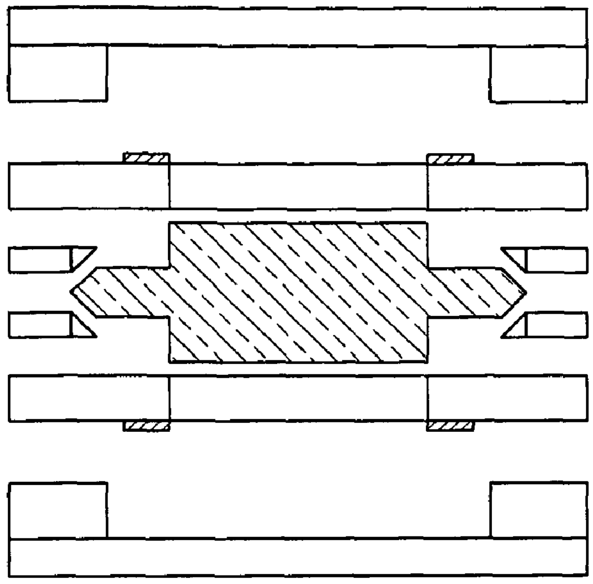
FIG. 3 is an exploded view of the microfluidic device of FIG. 2.

FIG. 3 is an exploded view of the microfluidic device of FIG. 2. Referring to FIG. 3, the microfluidic device can be manufactured by manufacturing a frame to which the ion-exchange material 201 is fixed, frames to which the anode electrode 205 and the cathode electrode 209 are fixed, frames forming surfaces of the anode chamber 203 and the cathode chamber 207 which are not defined by the on-exchange material 201, and then assembling all the frames. The material of each of the frames is not restricted.

Figure 4:
FIG. 4 is a photograph of a frame to which an ion-exchange material of the microfluidic device of FIG. 2 is fixed.
Figure 4:
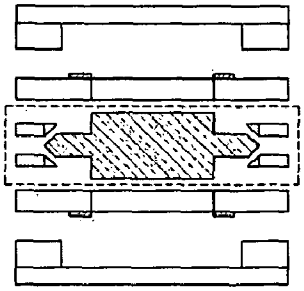

FIG. 4 is a photograph of the frame to which the ion-exchange material 201 of the microfluidic device of FIG. 2 is fixed. The ion-exchange material 201 may be fixed to the frame by injecting a liquid ion-exchange material into a predetermined mold including a to-be-the frame to which the ion-exchange material 201 is fixed and simultaneously crosslinking and forming the ion-exchange material 201 into a membrane.

Figure 5A:
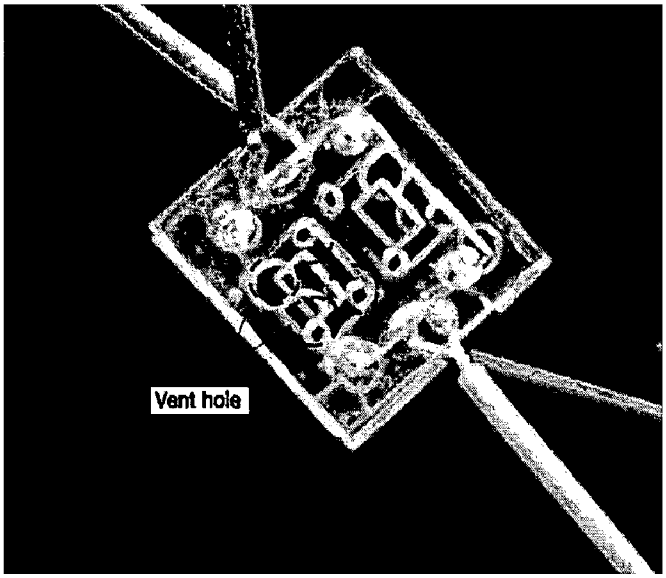
FIG. 5A is a plan photograph of a microfluidic device for explaining a method of regulating the pH of a fluid according to an embodiment of the present invention.
Figure 5B:
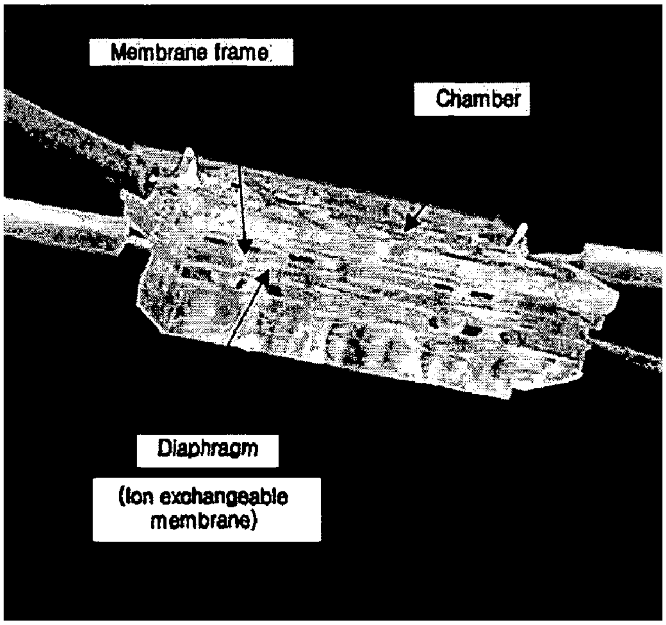
FIG. 5B is a side photograph of the microfluidic device of FIG. 5A.

FIG. 5A is a plan photograph of a microfluidic device for explaining a method of regulating pH of a fluid according to an embodiment of the present invention. FIG. 5B is a side photograph of the microfluidic device of FIG. 5A.

According to another aspect of the present invention, there is provided a method of electrochemically regulating the pH of a fluid in a microfluidic device. The method includes: a) injecting a solution containing ions with a lower or higher standard oxidation potential than water in an anode chamber; b) injecting a solution containing ions with a lower standard reduction potential than water in a cathode chamber; and c) applying current through an anode electrode and a cathode electrode to generate electrolysis in the anode chamber and the cathode chamber and accordingly regulate the pH of the solution injected into the anode chamber or the cathode chamber.

Examples of the anions with the lower standard oxidation potential than water, the anions with the higher standard oxidation potential than water, and the cations with the lower standard reduction potential than water are the same as described above. The ion introducing operations a) and b) may be performed simultaneously or sequentially.

The pH of the solution can be regulated according to the direction of the applied current, the magnitude of the applied current, the duration of the applied current, the width of each of the electrodes, or the thickness of an ion-exchange material. The direction, the magnitude, and the duration of the applied current, the area of each of the electrodes, and the thickness of the ion-exchange material may vary according to desired pH or the size of each of the chambers, and could be easily determined by one of ordinary skill in the art through experiments.

If a sample solution containing NaCl, which is most frequently used in biological sample solutions, is injected into the anode chamber and the cathode chamber, not water but chloride is electrolyzed in the anode chamber to generate chlorine gas such that the chlorine gas and water react to generate hydrogen ions, the number of which is less than that of hydroxide ions generated in the cathode chamber. Since the number of hydrogen ions vary according to the condition of the chlorine gas, it is difficult to regulate pH. To solve the problem, the microfluidic device according to the present invention uses a solution containing ions with a lower standard oxidation potential than water in the anode chamber and a solution containing ions with a lower standard reduction potential than water in the cathode chamber. However, for cell lysis only, a sample solution containing NaCl can be injected into the anode chamber and the cathode chamber and then electrolysis can be carried out to lyse cells in the cathode chamber.

In the method according to the present invention, since the cathode chamber solution contains the ions with the lower standard reduction potential than water, water is electrolyzed to generate hydrogen gas and $OH^-$ ions. Since the anode chamber solution contains the ions with the lower standard reduction potential than water, water is electrolyzed to produce oxygen gas and $H^+$ ions. As a result, the cathode chamber solution is basic and the anode chamber solution is acidic.

The present invention will be explained in detail with reference to the following examples. The following examples are for illustrative purposes and are not intended to limit the scope of the invention.

EXAMPLE 1

Manufacture of Microfluidic Device for Regulating pH

To manufacture a microfluidic device for regulating pH according to an embodiment of the present invention, respective frames of the microfluidic device as shown in FIG. 3 were manufactured.

50 μl of 0.5 wt % sulfonic acid group substituted styrene ion-exchange resin solution in Formula 1, 100 μl of 45 wt % acrylamide ($CH_2CHCONH_2$), 50 μl of 0.1 wt % bis-acrylamide ($CH_2(CH_2CHCONH)_2$), and 30 μl of 10 wt % ammonium persulfate, and 5 μl of TEMED were poured in a mold including a predetermined frame up to the height of each of the electrode and a crosslinking process was performed at room temperature for 20 minutes. All the solvents were ultrapure water. The reactants were simultaneously crosslinked and hardened, resulting in a cation-exchange material. The mold was removed, and a frame to which the ion-exchange material is fixed was manufactured (see FIG. 4).

(1)

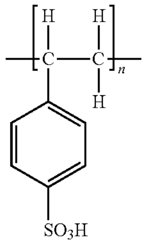

where n is an integer ranging from 2 to 100,000.

A frame to which the anode electrode or the cathode electrode was fixed was manufactured using a semiconductor manufacturing process. That is, a photoresist was coated on a glass substrate, exposed using a mask, developed, and then coated with Pt with a thickness of 1000 A and Ti with a thickness of 100 A to form an electrode. Thereafter, the photoresist was removed, a hole was generated through sandblasting, and the resultant structure was diced to form the frame to which the anode electrode or the cathode electrode was fixed.

Frames forming surfaces of the anode chamber and the cathode chamber which are not defined by the ion-exchange material were manufactured by dry-etching an Si wafer with a thickness of 1000 μm to a depth of 500 μm using a STS multiplex system, e.g., DeepRIE, or using a polydimethylsiloxane (PDMS).

The microfluidic device according to the present embodiment was manufactured by assembling the manufactured frames. The size of the hole was 5.1 $cm^2$ and the size of each of the electrodes was 14.9 $cm^2$.

FIG. 5A is a plan photograph of the microfluidic device. FIG. 5B is a side photograph of the microfluidic device of FIG. 5A.

EXAMPLE 2

Manufacture of Microfluidic Device for Regulating pH

The microfluidic device in Example 2 was manufactured in the same manner as the microfluidic device in Example 1 except that the size of a hole was 11.2 $cm^2$ and the size of an electrode was 8.8 $cm^2$.

EXAMPLE 3

Measurement of Magnitude of Current During Voltage Supply Using Microfluidic Device The magnitude of current during voltage supply was measured using the microfluidic devices in Examples 1 and 2. The magnitude of current was proportional to the change of pH.

That is, each of the cathode chamber and the anode chamber of the microfluidic device in either Example 1 or 2 was filled with a 100 mM $Na_2SO_4$ solution, a DC voltage of 5 V was applied at room temperature, and then current between both the electrodes was measured.

Figure 6:
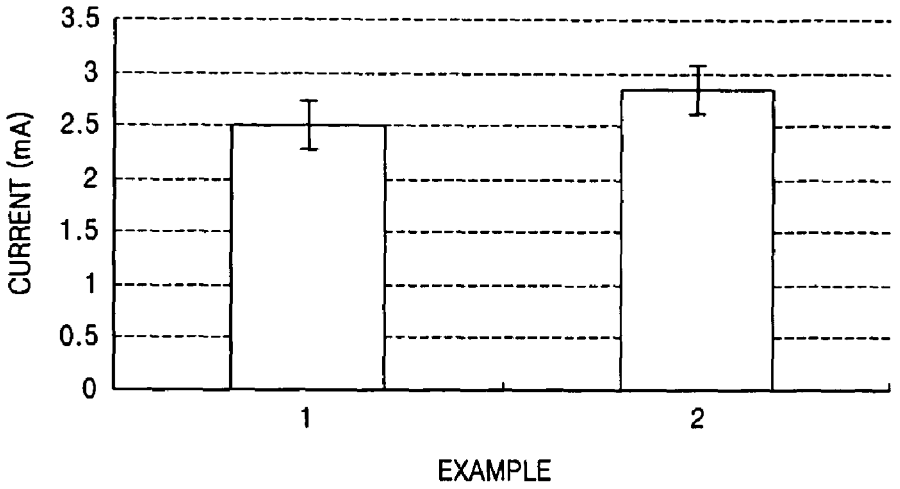
FIG. 6 is a graph illustrating a relationship between current and voltage applied to the microfluidic device of FIG. 5A.

FIG. 6 illustrates the measurement results of the magnitude of current during voltage supply using the microfluidic device. Referring to FIG. 6, the magnitude of current is inversely proportional to resistance and resistance varies according to the design of the chip. The magnitude of current when the microfluidic device in Example 1 was used was smaller than that when the microfluidic device in Example 2 was used.

Although there is a slight difference, the current of both the microfluidic devices in Examples 1 and 2 is of sufficient magnitude, and both the devices can be effectively used to regulate pH through electrolysis.

The magnitude of current is affected by the resistance of the ion-exchange material. Since the ion-exchange material functions as a kind of conductive line, as the thickness of the ion-exchange material increases and the cross-section of the ion-exchange material decreases, the resistance of the ion-exchange material increases and the magnitude of current decreases.

EXAMPLE 4

Measurement of Ion Separation Efficiency of Microfluidic Device

The ion separation efficiency of each of the microfluidic devices in Examples 1 and 2 was measured.

That is, after a voltage of 5 V was applied for 40 minutes under the same conditions as Example 3, no voltage was applied for 60 seconds and a change in pH in the cathode chamber was measured.

Figure 7:
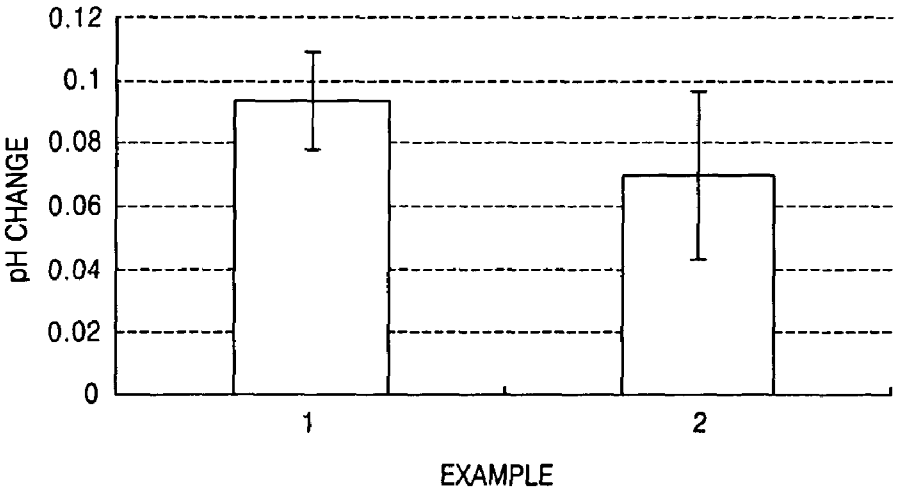
FIG. 7 is a graph illustrating change in pH when voltage is applied to a cathode chamber of the microfluidic device of FIG. 5A and then no voltage is applied for a predetermined period of time.

FIG. 7 illustrates the measurement results. Referring to FIG. 7, the pH changes in the cathode chambers of Examples 1 and 2 were approximately 0.095 and 0.07, respectively. Accordingly, the pH variation in the microfluidic device of Example 2 was smaller than in the microfluidic device of Example 1. Although there is a slight difference, since the pH variation in both the microfluidic devices manufactured in Examples 1 and 2 was sufficiently low, the two devices show excellent ion separation efficiency and can effectively regulate pH through electrolysis.

As described above, a microfluidic device according to the present invention can rapidly regulate pH therein, and thus effectively perform a series of biological analysis processes, which require different pH at each step, including cell lysis. The microfluidic device can be easily miniaturized since the ion-exchange material forms a membrane simultaneously with a crosslinking reaction. Moreover, the method according to the present invention can regulate the pH of a fluid in the microfluidic device in a rapid and easy manner.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A microfluidic device for electrochemically regulating the pH of a fluid, the microfluidic device comprising:

an ion-exchange material;

an anode chamber having a surface defined by a surface of the ion-exchange material and an anode electrode disposed along an edge of the surface of the anode chamber; and a cathode chamber having a surface defined by an opposite surface of the ion-exchange material and a cathode electrode disposed along an edge of the surface of the cathode chamber.

2. The microfluidic device of claim 1, wherein the ion-exchange material transmits current but separates ions and gas generated through electrolysis in each chamber.

3. The microfluidic device of claim 1, wherein when the ion-exchange material forms a membrane simultaneously with a crosslinking reaction, the ion-exchange material is fixed to a frame.

4. The microfluidic device of claim 3, wherein the frame has a V-shape.

5. The microfluidic device of claim 1, wherein each of the anode electrode and the cathode electrode is selected from the group consisting of platinum, gold, copper, palladium, and titanium.

6. The microfluidic device of claim 1, wherein the anode chamber and the cathode chamber include gas vent holes formed in a surface of the anode chamber facing the anode electrode and in a surface of the cathode chamber facing the cathode electrode, respectively.

7. The microfluidic device of claim 1, wherein each of the anode chamber and the cathode chamber includes an inlet through which a solution is introduced and an outlet through which a solution is discharged.

8. The microfluidic device of claim 1, wherein each of the anode chamber and the cathode chamber includes a pump for introducing and discharging a solution.

* * * * *